Patented Nov. 12, 1929

1,735,763

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF ORGANIC COMPOUNDS

No Drawing.   Application filed August 8, 1927.   Serial No. 211,638.

This invention relates to processes of oxidizing organic compounds, particularly in the vapor phase.

According to the present invention, organic compounds are oxidized, particularly in the vapor phase, in the presence of catalysts or contact masses which contain non-silicious base exchange bodies. Some of these new catalysts have been described and claimed as products in my co-pending application Patent No. 1,694,620, issued December 11, 1928, of which the present application is in part a continuation.

The non-silicious base exchange bodies used in the present invention may be produced by the reaction of metallate components with metal salt components under conditions so that the reaction mixture remains substantially alkaline to litmus. The invention is in no sense restricted to the use of catalysts which are the reaction products of a single metallate and a single metal salt component, and some of the most effective catalysts for use in the present invention are the reaction products of a plurality of metallate components with one or more metal salt components or a plurality of metal salt components with one or more metallate components.

All of the base exchange bodies used in the present invention, that is to say, catalytically active bodies which are prepared by the reaction of a single metallate with a single metal salt, or bodies produced by the reaction of at least one metallate with a plurality of metal salts, or vice versa, possess a remarkably porous, frequently microporous, structure and in some cases are opalescent. When suitable catalytically active components are present in the products, they form catalysts of remarkable efficiency, due, probably, to the extraordinarily high surface energy of the microscopically porous structures, and probably also to the presence of unsaturated valences in many cases, and asymmetry of molecules. It is, of course, possible that the catalytic activity of the products is due partly or wholly also to other reasons, and the present invention is not intended in any sense to be limited by any theory of action of the products. The molecular complexes which are present are apparently of great size and complexity, and the exact chemical constitution has not been determined. In fact it is not even definitely determined whether single chemical compounds are formed in any or all cases and it is possible that molecular mixtures are present. The products possess a physically microscopical homogeneity and behave in many ways as if they were single compounds, and I am of the opinion that probably in many cases the products are in fact single compounds of very high molecular weight, but the invention is not limited to any theories of the chemical constitution of the products.

It should be clearly understood that the products used in the present invention are chemically quite distinct from base exchanging bodies containing silicon, such as, for example, the zeolites and related base exchange bodies and their derivatives. The present compounds contain no silicon in their structure, and while they share many of the physical properties of zeolites, namely, the highly porous structure and the power of exchanging their alkali cations for other cations by base exchange, they are chemically distinct products. Surprising as it may seem. the presence of silicon, which has hitherto been considered as essential to the formation of the skeletons of such advantageous physical structure, appears to be only one of many elements which are capable of bringing about these physical properties, and many of the base exchange bodies of the present invention possess all of the mechanical strength and resistance of the silicious zeolites, properties which are of course of utmost importance in catalytic oxidations of organic compounds.

A number of elements are capable of forming alkali metal metallates, at least in their higher states of oxidation, and can be used singly or in mixtures, as the metallate components for producing base exchange bodies used in the present invention, it being understood, of course, that the choice will depend on the metal salts to be used and on the catalytic effects which it is desired to produce. Among the elements which form metallates are the following:—aluminum, chromium, zinc, vanadium, beryllium, tin, palladium, platinum, titanium, zirconium tungsten, uranium, tantalum, boron and molybdenum. The elements which form the metallates may be present in the form of their oxides or hydroxides united with alkali to form simple metallates, or they may be present partly or wholly in the form of complex compounds, such as for example, ammonia complexes, cyanogen complexes, and the like. In general, the complex compounds described in the copending application of Jaeger & Bertsch, Serial No. 100,116, filed April 6, 1926, may be used.

The metal salt components include the water soluble, neutral or acid salts of the following elements:—copper, silver, gold, beryllium, zinc, cadmium, aluminum, rare earths, titanium, zirconium, tin, lead, thorium, chromium, uranium, vanadium, manganese, iron, nickel, cobalt, platinum, palladium, which may be used alone or in any desired mixture. It is an advantage of the present invention that definite proportions of the individual compounds do not need to be used, either because mixtures of different compounds are formed, or, more probably, because the tremendous size and complexity of the molecule masks any requirements for definite proportions.

All of the products used in the present invention possess base exchanging powers to a greater or less extent when first prepared in solutions which are substantially neutral or alkaline to phenolphthalein. For the oxidation of organic compounds, however, high base exchanging power of the products is not required, and it is therefore possible to depart considerably from the optimum conditions of production as far as base exchange power goes. In other words, the limits of alkalinity, neutrality or acidity are much wider than in the case of products which are to be used for water softening, and which therefore depend primarily on their base exchanging power. While usually the highest base exchanging powers are obtained when the compounds are produced in a reaction mixture which is substantially neutral or alkaline to phenolphthalein, products having a similar physical structure and being desirable for the catalytic oxidation of organic compounds can be prepared with somewhat different proportions of the components, so that at the end of the reaction the mixture may possess any alkalinity or acidity between phenolphthalein red and litmus blue as indicator end points.

The possibilities of producing catalysts according to the present invention are not limited to the reaction products of the metallates and metal salt components which may be used and which are present in the molecules is a non-exchangeable form. On the contrary, a further series of products can be prepared by exchanging part or all of the alkali cations for other atoms or radicals by means of base exchange. The number of cations which can be introduced is very large, and some of them are included in the following elements and radicals:—ammonium, copper, silver, gold, beryllium, magnesium, caesium, zinc, strontium, cadmium, barium, mercury, aluminum, thallium, titanium, zirconium, tin, thorium, vanadium, chromium, uranium, manganese, iron, cobalt, nickel, palladium, platinum. These cations may be introduced either singly or in mixtures, simultanenously or successively. The wide possibilities of combination which can be effected by the introduction of various cations by means of base exchange gives the catalytic chemist an almost infinite field of choice in preparing catalysts having just the right degree of activity for organic oxidations, and it is an advantage of the present invention that catalysts of exceedingly finely adjusted activity can be produced and are effective. The cations introduced by base exchange may be themselves catalytically active, or they may activate catalytic components which are present in the products in non-exchangeable form. Cations may also be introduced as simple ions or as complex ions. In all cases, the catalytic activity of the products obtained is enhanced by the favorable physical structure of the products.

A further series of products can be obtained by treating the base exchange bodies used in the present invention, either with or without the presence of cations introduced by base exchange, with products containing anions which are capable of reacting with the base exchange body to form salt-like products.

In the contact masses containing salt-like bodies which are used in the present invention the catalytically effective components may be present solely in the base exchange body, solely in the anion of the salt-like body, or partly in one and partly in the other. Acid radicals of the following elements, either simple acids, polyacids or complex anions, can be used in producing salt-like bodies with the base exchange bodies of the present invention:— vanadium, tungsten, uranium, chromium, molybdenum, manganese, tantalum, arsenic, phosphorus, bismuth, sulfur, chlorine, platinum, boron. Complex ions, such as for example, ferro and ferricyanogen, sulfocyanogen, metal cyanogen, and the like, may also be used wherever they form salt-like bodies with the base exchange bodies of the present invention. A single acid radical may be introduced, or a mixture may be used, either by a simultaneous or successive treatment. The amount of the acid radical used may also be varied so that the products may possess the character of acid, neutral or basic salts.

While it is possible to use certain of the catalysts of the present invention in an undiluted form, best results are usually obtained by the dilution of the products with more or less inert bodies, or with bodies of relatively feeble catalytic powers or activating powers. Diluents can be incorporated with the catalytically active base exchange body before or after formation, and are preferably, although not necessarily, incorporated therewith to produce a physically homogeneous structure. In addition to finely divided carriers, diluted or undiluted catalytically active base exchange bodies can be coated on or impregnated in relatively massive carrier fragments, the incorporation taking place before, during or after formation of the base exchange body. It should be understood, of course, in all cases, that where a perfectly homogeneous product is desired, the incorporation of diluents must take place before the base exchange body after formation has set. Practically all of the base exchange bodies used in the present invention are first formed as gels, in which condition they can be incorporated with diluents or carrier bodies, but after once setting, and particularly after drying, it is of course impossible to incorporate diluents into the base exchange body other than by purely physical mixture, which in general is less desirable, but which is not excluded from the broader aspects of the present invention.

A large number of diluent bodies can be used, such as silicious materials, as kieselguhrs of all kinds, diatomite brick refuse, pumice meal, pulverized quartz, sand, and other minerals, especially those rich in silica. In the same way, a large number of natural or artificial massive carrier fragments can be used, such as fragments of pumice, diatomite bricks or other minerals, metal granules and the like. In general, the methods of incorporation and many of the diluents which can be used are described in the copending application of Jaeger and Bertsch, Serial No. 95,771, filed March 18, 1926.

The high porosity of the products which are prepared may be even further increased by incorporating into the framework of the base exchange body products which can be removed by leaching, volatilization or combustion, and which when removed leave additional porous spaces and produce an even more advantageous physical structure. The substances added may be of organic or inorganic nature and may be added as individuals or may be in chemical combination with some of the permanent components. Thus for example, certain of the components may be introduced in the form of complex compounds which are later decomposed and then leave additional porous spaces. Examples of such compounds are certain ammonia complexes which can be decomposed by heating the finished product.

In general, the reaction of the component solutions results in the production of soluble salts which are not wanted, and it is therefore usually desirable to wash the base exchange body, after precipitation, and then to dry, or dry first and then wash. I have found that while it is possible in some cases to dry at high temperature, for the best results, in most cases drying temperatures of 100° C., or less, are desirable.

In the general methods described above, separately prepared metallate components and metal salt components have been caused to react. While for many purposes these are the preferred methods, it is possible to prepare base exchange bodies by somewhat different methods. Thus for example, if a solution of a metallate of amphoteric metal is cautiously neutralized with acid until the strongly alkaline reaction becomes weakly alkaline to phenolphthalein, or even slightly acid with weak alkalinity to litmus, as a limit, base exchange bodies are produced, and in many cases are of importance, particularly for certain oxidation processes. Instead of the metallates, the amphoteric metals may also be present in the form of complex metallate compounds, for example, such complex compounds as are described in the co-pending application of Jaeger & Bertsch, referred to above.

In a similar manner, acid or neutral solutions of salts of amphoteric metals may be treated with alkali until the mixture becomes neutral or alkaline to phenolphthalein, or even acid, in which case base exchange bodies are produced in a manner similar to that described in the foregoing paragraph. The base exchange bodies produced either by neutralizing metallate solutions or metal salt solutions in general do not show quite as great base exchange power as do those which are prepared by causing ready made metallate and metal salt solutions to react with each other. The physical structure, however, appears to be similar and, as in many cases, particularly in certain oxidation processes, extremely high base exchange power is not essential. Many very valuable catalysts can be produced in this manner.

A further wet preparation consists in causing alkali metal salts of the oxygen-containing acids of metal elements of the fifth and sixth groups of the periodic system, such as for example, vanadium, molybdenum, tantalum, tungsten, and the like, to react with neutral or acid salts of metals, particularly metals which are strongly amphoteric. Preferably there should be an excess of alkali. The salts of the fifth and sixth group acids may be used alone or in combination with other metallates.

In addition to the wet methods, which for most purposes I find are preferable, base exchange bodies can be produced by fusion methods, for example, by fusing oxides or hydroxides of the metallate and metal salt components with alkali, such as, sodium carbonate or potassium carbonate or their hydroxides. The base exchange bodies produced by fusion, while sometimes not possessing quite as high base exchange powers, are nevertheless of a similar advantageous physical structure, and many of the products are very valuable catalysts. Oxides of the metals of the fifth and sixth groups may also be used to form products somewhat similar to those described in the preceding paragraph by fusion methods.

The non-silicious base exchange catalysts described above contain the catalytically active element or elements in chemical combination with the base exchange body or forming part thereof, and they are among the most effective catalysts used in the present invention. It is not necessary, however, that the catalytic activity should reside in the base exchange body itself, and many very important catalysts can be produced in which catalytically inactive base exchange bodies are united with catalytically active diluents to form physically homogeneous masses. These masses, although they do not contain catalytic elements chemically combined with the base exchange body, of course share its microporous structure, and where suitable catalytically active diluents are used, catalysts of great efficiency are obtained, and are included in the scope of the present invention. Of course the catalytic activity may reside both in the diluents and in the base exchange body.

The catalysts used in the present invention, and particularly diluted catalysts, may in many cases with advantage be given a preliminary treatment consisting in a calcination and exposure to oxidizing or acid vapors at an elevated temperature as described in my United States Letters Patent Nos. 1,678,626 and 1,678,627, patented July 24, 1928. Such treatments frequently produce secondary chemical changes as are produced in the catalysts themselves, and it should be understood that the catalysts of the present invention are defined as to chemical composition as of the time when they are freshly made, in accordance with the usual methods of definition in catalytic chemistry.

Many of the organic reactions which are included in the present invention, and particularly the oxidation of many aromatic compounds, require a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some reactions. Other catalytically active or activating substances which are not specific catalysts for the particular oxidation in question which enhance the effectiveness of the stabilizers, and which are termed stabilizer promoters, may also be used. In fact whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the particular oxidation reaction may be considered, and act as stabilizer promoters. I do not claim in this application the use of stabilizers or stabilizer promotors in general, as these form the subject-matter of my Patent No. 1,709,853, granted April 23, 1929. The expressions "stabilizers" and "stabilizer promoters", when used in the present application, are to be understood as used in the sense in which they are defined in the afore-mentioned co-pending application. It should be understood that while many of the base exchange catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds, are to be considered as stabilizer promoters.

The present invention is applicable to all types of catalytic organic oxidations. Among some of the most important reactions in which the present process can be used are the following:—the oxidation of benzol, toluol, phenol, tar phenols or furfural to maleic acid and fumaric acid; cresol to salicylaldehyde and salicyclic acid; tuluol and the various halogen and nitro substituted toluols to the corresponding aldehydes and acids; xylenes, pseudo, cumene, mestitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone and diphenic acid; acenaphthene to acenaphthylene, acenaphthaquinone, bisacenaphthylidenedione, naphthaldehydic acid, napthalic anhydride and hemimellitic acid; fluorene to fluorenone; eugenol and isoeugenol to vanillin and vanillic acid; methyl alcohol and methane to formaldehyde; ethyl alcohol to aectic acid; ethylene chlorhydrine to chloracetic acid, and the like. Mixtures of organic compounds such as, for example, coal tar fractions may also be oxidized to mixtures of valuable oxidation products. In addition to the above reactions and other similar reactions in which the desired products are the products of oxidation, the catalysts used in the present invention are important in such oxidation reactions in which an undesired impurity is burned out or transformed into a product easily separable from the main compound present, such as for example the catalytic purification of crude naphthalene, crude anthracene, coal tar ammonia and the like, with selective oxidation of some or all impurities, and in reactions in which impurities are burned out and at the same time certain organic compounds are oxidized into products which it is desired to obtain, such as for example, the direct production of anthraquinone from crude anthracene especially with concomitant total combustion of carbazole, phenanthrene and other impurities. In fact processes of the present invention are applicable to any organic oxidation.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular reaction in which he is interested.

*Example 1*

40 parts of $V_2O_5$ are suspended in 500 parts of water and acidified with a little concentrated sulfuric acid. The suspension is heated almost to the boiling point and gases containing $SO_2$ are passed through until the vanadic acid suspension is completely dissolved as blue vanadyl sulfate. Sometimes it is necessary to add some water in order to get the vanadyl sulfate entirely dissolved.

The blue solution is then divided into two parts, one of which is set aside and the other treated with 5 N. potassium hydroxide solution at 50 to 60° C. until a clear coffee brown solution of potassium vanadite is obtained.

The vanadite solution is mixed with 70 parts of small diatomite brick fragments or 40 parts of "Celite" and 40 parts of quartz particles, the mixture being stirred until it becomes uniform. Other diluent bodies such as neutral silicates, sand, silica gel, ground rocks, tuffs, lava of volcanic or eruptive origin, or similar materials may be used. To the solution containing potassium vanadite the second half of the vanadyl sulfate solution is added, care being taken that even after all of the vanadyl sulfate has been added, the solution remains alkaline or neutral to phenolphthalein. The reaction product, after separation from the mother liquor by filtration and drying at 60 to 70° C., is broken into fragments and constitutes a base exchange body containing potassium and tetravalent vanadium, part of the vanadium playing the part of an acid radical and part that of a base in the nonexchangeable portion of the molecule.

The product obtained is well suited for the catalytic oxidation of toluol to benzaldehyde, chlortoluols, dichlortoluols, chlorbromtoluols, nitro-toluols, chlor-nitro-toluols, brom-nitro-toluols and the like, to the corresponding substituted benzaldehydes, the vapors of the compounds, mixed with air in the proportion of 1:15 to 1:30 being passed over the catalyst at temperatures of 320 to 440° C.

*Example 2*

A diluted potassium vanadyl base exchange body is prepared as described in Example 1 and is then sprayed with 3 to 5% inorganic acids such as, for example. sulfuric acid, phosphoric acid, nitric acid, hydrochloric acid or the like until the potassium in the exchangeable part of the base exchange body has been neutralized and a so-called salt-like body is obtained. This salt-like body tends to oxidize toluol and the substituted toluols preferentially to the corresponding benzaldehydes and benzoic acids, the acids predominating, the vapors of the compounds being mixed with air in the proportion of 1–20 and passed over the catalyst at temperatures of 360 to 450° C.

The salt-like body described above is also well suited for the oxidation of fluorene to fluorenone, naphthalene to alphanaphthaquinone or phthalic anhydride, depending on the reaction conditions.

*Example 3*

A base exchange body is prepared as described in Example 1, except that diluent bodies are omitted. The product thus produced is a good catalyst for the vapor phase oxidation of benzol to maleic acid and fumaric acid and methyl alcohol to formaldehyde, if this undiluted base exchange body is pretreated with 3 to 5% sulfuric acid or nitric acid in order to form its so-called salt-like body.

Similar reaction conditions and similar gas concentrations, as described in Example 1, may be used in order to carry out these catalytic reactions.

*Example 4*

A diluted or undiluted potassium vanadyl base exchange body, as described in the foregoing examples, is coated onto massive carrier fragments such as, for example, materials rich in silica, as quartz fragments, quartz filter stones, sand stones, fragments of silica gel, diatomaceous stones, "Celite" bricks, pumice fragments, asbestos, fragments of natural or artificial silicates and diluted or undiluted zeolites, metals such as aluminum granules, metal alloys, ferro-silicon, ferro-vanadium, ferro-chrome and the like, particularly where their surface has been roughened.

The coating can be either after formation of the product or the product can be caused to react on the carrier fragments and be generated in situ. Artificial carrier fragments can also be prepared, for example, by forming fragments of "Celite," kieselguhr, pulverized silica gel and silicates, highly absorptive glaucosil, which is the siliceous residue from the acid extraction of green sand, diluted or undiluted zeolites, using various adhesives, such as waterglass, alkalies and alkali metal salts, followed after action by calcination at 400 to 500° C. and if necessary treatment with acids.

When the base exchange body or its saltlike body is coated onto the carrier fragments, as enumerated above, after it has been formed, various adhesives can be used which may be stabilizers or stabilizer promoters for the catalyst. Thus, for example, many acid, alkaline and neutral salts of the alkali-forming metals such as sulfates, chlorides, nitrates, nitrites, waterglass, carbonates, hydroxides and the like can be used.

Instead of introducing diluent bodies into the base exchange body during formation, as described in the foregoing examples, the undiluted base exchange body can be prepared from its components potassium vanadite and vanadyl sulfate, and then mixed mechanically in aqueous suspension with the diluent bodies, or the base exchange body may be dried and pulverized and then mixed with the latter. For example, 50 parts of "Celite" brick particles may be used and the mixture formed into granules with any of the above described adhesives. A very efficient catalyst is thus produced for the catalytic oxidation of xylenes, mesitylene, pseudocumene and paracymene to the corresponding aldehydes and acids, the vapors of the compounds being mixed with air in the proportion of about 1–20 and passed over the calcined catalyst at temperatures of 340 to 420° C.

Example 5

20 parts of $V_2O_5$ are suspended in 500 parts of water, as described in Example 1, acidified with a little concentrated sulfuric acid and reduced to vanadyl sulfate by means of gases containing $SO_2$ the mixture being heated almost to boiling. The blue solution obtained is treated with sufficient 2 N. potassium hydroxide solution to precipitate a voluminous brown precipitate of $V_2O_4$ which is then sucked and suspended in 200 parts of water. It is then gradually warmed to 60–70° C. and additional 2 N. potassium hydroxide solution is added until all of the $V_2O_4$ dissolves to form a coffee brown solution. This requires an excess of potassium hydroxide. The potassium vanadite thus produced is then stirred with 60 parts of infusorial earth and 2 N. sulfuric acid is gradually poured into the solution with vigorous agitation until the latter just remains alkaline to phenolphthalein. Instead of sulfuric acid, phosphoric acid may be used. The sulfuric acid brings down a brown precipitate while phosphoric acid brings down a brownish blue precipitate. The precipitates are pressed and then dried at temperatures below 100° C. The products thus obtained are saturated with a dilute waterglass solution formed of 110 parts of 33° Bé. waterglass solution diluted with 100 parts of water. After impregnation, the product is again dried and broken into fragments and treated at 400 to 450° C. with diluted burner gases in order to neutralize the alkali in the base exchangeable part of the body.

The contact mass so prepared is an excellent catalyst for the catalytic oxidation of naphthalene to phthalic anhydride when a naphthalene vapor and air mixture in the proportion of about 1–20 is passed over the catalyst at 370 to 400° C.

Example 6

A product is prepared as described in the foregoing example except that 180 parts of waterglass are used instead of 110. The catalyst thus produced is excellent for the oxidation of naphthalene to alphanaphthaquinone when a mixture of naphthalene vapors and air in the proportion of 1:35 by weight is passed over the contact mass at 370–400° C.

Example 7

20 parts of $V_2O_5$ is reduced to a vanadyl sulfate solution as described in the foregoing examples and is diluted with 60 parts of infusorial earth. 2 N. potassium hydroxide is added in portions in the cold with vigorous agitation until the mixture just remains alkaline to phenolphthalein. The body precipitated is treated in the usual manner as described in the foregoing examples, and is an excellent catalyst for the oxidation of naphthalene to phthalic anhydride, when a naphthalene vapor and air mixture in the proportion of 1:20 is passed over the catalyst at 380–420° C.

Example 8

Diluted base exchange bodies, as described in the foregoing examples, are prepared with diluents which have been impregnated with ferric oxide, silver oxide or copper oxide, the diluents being incorporated into the base exchange body during its formation. These products are then sprayed with sufficient normal sulfuric acid to form the so-called salt-like bodies and to completely neutralize the alkali content of the base exchange body. Such a contact mass containing 6-8% of ferric oxide is particularly effective for the oxidation of anthracene to anthraquinone at a temperature of 350-400° C., when a mixture of anthracene and air in a proportion of 1:40 is passed over the catalyst.

A contact mass as described above which contains about 4% silver oxide and 6% copper oxide instead of ferric oxide is well suited for the oxidation of methyl alcohol to formaldehyde at 370 to 390° C., the methyl alcohol vapors and air being passed over the catalyst in the proportion of 1:25 by weight.

Similar catalysts can be obtained by impregnating the diluents with ferric sulfate, silver nitrate or copper nitrate.

Example 9

12 parts of vanadic acid are treated with sufficient 2 N. potassium hydroxide solution so that not only is all of the $V_2O_5$ dissolved in the form of potassium vanadate, but an excess of 14 parts of 100% KOH remains. A mixture of 120 parts of comminuted quartz and 20 parts of kieselguhr is impregnated with the above described solution. The second solution is prepared by reducing 10 parts of vanadic acid to vanadyl sulfate in the usual manner and neutralizing the excess sulfuric acid with 2 N. potassium hydroxide solution.

Solution 2 and suspension 1 are then kneaded together thoroughly and dried at temperatures under 100° C. The product is a base exchange body containing $K_2O$, $V_2O_5$, and $V_2O_4$. The large lumps are broken into small fragments whereby a good, efficient catalyst is obtained for the catalytic oxidation of tar ammonia. Tar ammonia mixed with air, a large excess of air in proportion to the organic impurities of the ammonia being preferable, is led over the contact mass at 380-450° C. The organic impurities are entirely burned out or transformed into water soluble compounds and the resulting ammonia is purified by selective oxidation of the organic impurities.

Example 10

Base exchange bodies are prepared by using potassium tungstate, potassium chromate, potassium molybdate or potassium tantalate in molecularly equivalent amounts instead of potassium vanadate as in Example 9. These catalysts especially after preliminary treatment with burner gases diluted with air at 450-500° C., are well suited for the oxidation of toluol to benzaldehyde and benzoic acid and substituted toluols to the corresponding aldehydes and acids when the vapors of these products, mixed with air in the proportion of 1:35 by weight, are passed over the contact masses at 340-390° C.

Example 11

22 parts of basic copper carbonate are dissolved in the form of the cuprammonium compound.

10.2 parts of freshly precipitated aluminum hydroxide are dissolved up in sufficient 2 N. sodium or potassium hydroxide solution to form a clear sodium or potassium aluminate solution. 24 parts of copper nitrate containing 3 mols of water are dissolved in 100 parts of water.

The cuprammonium carbonate and the aluminate solution are then mixed together and 100 parts of kieselguhr are introduced with vigorous agitation, or 150 parts of quartz or pumice meal may be substituted therefor. The copper nitrate solution is then poured into the mixture with vigorous agitation and a gelatinous blue product forms which is neutral or slightly alkaline to phenolphthalein.

The product is a base exchange body containing sodium or potassium, copper and aluminum, and is diluted with material rich in kieselguhr. The gel is pressed and dried at temperatures under 100° C. and then broken in fragments. If the fragments do not possess sufficient strength they may be treated with 5-10% diluted potassium waterglass solution and dried again.

Instead of using the contact masses, as described, the diluted and undiluted contact masses may be coated onto fragments of pumice or quartz by means of a waterglass solution and can then be used effectively as contact masses, especially if such undiluted base exchange bodies are applied.

These contact masses described are well suited for the catalytic purification of crude anthracene to high grade anthracene whereby the main impurities such as carbazol are substantially burned out and the other impurities such as phenanthrene are burned out to a large extent. In the process 25-50% crude anthracene, especially 30-35% anthracene presscake, uniformly vaporized with air in the ratio of about 1:20 is led over such a contact mass layer at 380-430° C.

The purified anthracene obtained contains between 70-80% anthracene, practically no carbazol, and the remainder can be considered as phenanthrene. After a recrystallization from solvent naphtha using the minimum amount necessary to bring the purified anthracene into solution at 80% and cooling down to 15° C. the recrystallized anthracene obtained contains about 95-97% anthracene, is practically colorless, and of excellent quality.

Crude anthraquinone, for example, produced by the vapor phase oxidation of crude anthracene, may also be purified by passing its vapors admixed with air over the contact mass under the reaction conditions described above. Anthraquinone of high chemical purity is obtained.

Example 12

The following solutions are prepared:

1. 30 parts of nickel nitrate containing 6 mols of water of crystallization are dissolved in 200 parts of water and sufficient 25% ammonia is added until a clear solution of the nickel ammonium nitrate is obtained.

2. 4 parts of freshly precipitated aluminum hydroxide are stirred into a slurry with 50 parts of water and are then treated with a sufficient 10 N. sodium or potassium hydroxide solution to just form a clear solution of the corresponding aluminate.

3. 10 parts of chromium nitrate with 9 mols of water of crystallization are dissolved in 150 parts of water and then treated with 5–10 N. potassium or sodium hydroxide solution until the corresponding chromite is formed.

4. 8 parts of zinc nitrate containing 6 mols of water of crystallization are dissolved in 50 parts of water and treated with just sufficient 5–10 N. sodium hydroxide solution to form sodium zincate.

5. 40 parts of nickel nitrate with 6 mols of water of crystallization are dissolved in 200 parts of water.

6. 11 parts of zirconium nitrate with 5 mols of water of crystallization are dissolved in 150 parts of water.

7. 16 parts of titanium nitrate are dissolved in 160 parts of water.

Solutions 1, 2, 3 and 4 are mixed together and 300 parts of kieselguhr, pumice or quartz are stirred in.

Instead of these diluents pulverized nickel, copper or iron ores may also be used.

To the suspension, a mixture of the solutions of 5, 6, and 7 is added with vigorous agitation. A gelatinous reaction product forms and if it is strongly alkaline to phenolphthalein, the excess of alkali may be neutralized with 5% nitric acid until just neutral or alkaline to phenolphthalein whereby the yield of the base exchange body can be increased.

The product is dried at temperatures below 100° C. and is a base exchange body containing sodium, potassium, ammonium, nickel, alluminum, chromium, zinc, zirconium, and titanium. When broken into fragments and calcined at 400° C. it can be used as contact mass for the selective catalytic purification of crude anthracene to commercial high grade anthracene, starting with crude anthracene presscake and using the same reaction conditions as described in the foregoing example.

Crude anthraquinone, for example, produced by the vapor phase oxidation of crude anthracene, may also be purified by passing its vapors admixed with air over the contact mass under the reaction conditions described above. Anthraquinone of high chemical purity is obtained.

Example 13

66 parts of crystallized aluminum sulfate containing 18 parts of water of crystallization are dissolved in 200 parts of water and 10 N. sodium hydroxide solution is added until all the aluminum is transformed into sodium aluminate.

A second 66 parts of aluminum sulfate are then dissolved in 100 parts of water.

Diluent bodies such as coke, rocks, tuffs or trass of volcanic origin, and kieselguhr are stirred into solution 1 until the suspension just remains readily stirrable. The mixture is heated up to about 80° C. and the aluminum sulfate solution is gradually added with vigorous agitation, care being taken that even after the whole of the aluminum surfate solution is added, the alkalinity of the mixture remains between the turning points of phenolphthalein and litmus. This necessitates usually a small excess of alkali in the aluminate solution and the amount of the excess can easily be determined by a small test experiment.

If the reaction product is strongly alkaline to phenolphthalein, the alkalinity can be decreased by the addition of sulphuric or hydrochloric acid of 3–5% strength.

The base exchange body containing aluminum is obtained and is freed from its mother liquor by pressing and dried at temperatures under 100° C.

After hydrating with water in the usual way, the exchangeable alkali base is partly replaced by silver, using a 5% silver nitrate solution. After this treatment the base exchange body is further treated with 5–10% metallate solutions of the elements of the 5th and 6th groups of the periodic system, especially with soluble vanadate solutions such as ammonium vanadate and potassium vanadate solutions in order to form the vanadate of the diluted base exchange body containing silver in the exchangeable portion.

After again drying, the fragments, which now possess an entirely uniform yellow color, are calcined, first with air and then with $SO_2$ gases greatly diluted by air at 400–450° C.

This contact mass possesses a high catalytic efficiency for the catalytic oxidation of benzole, toluol and furfural to maleic acid and furmaric acid using these organic substances mixed with air in the ratio of 1:35 and passing them over the catalyst at a temperature between 380 and 420° C.

The aluminate component in this contact mass composition can be replaced wholly or partly by other amphoteric metals such as Zn, Pb, Cr, Sn, Be, Cd, singly or in admixture.

The aluminum sulfate component of the base exchanged body can also be replaced wholly or partly by other salt solutions such as the salts of Fe, Cr, Ni, Co, Mn, Cu, Be, Zr, Th, Ti, Ag, Cd, Sn, Ce, Pb, singly or in admixture.

*Example 14*

The following mixtures are prepared:
1. Freshly precipitated iron hydroxide is prepared by adding 5 to 6% ammonia to a 10 to 15% ferric nitrate solution at 40 to 50° C. until the reaction is ammoniacal. The finely divided iron hydroxide is then carefully washed with distilled water to remove the ammonium nitrate and dried at temperatures below 100° C.
2. 24 parts of a lead dioxide in the form of sodium plumbite are dissolved in water to form a 10% solution.
3. 3 parts of freshly precipitated aluminum hydroxide are dissolved up with 2 N. potassium hydroxide to form potassium aluminate.
4. 18 parts of thorium nitrate containing 12 mols of water are dissolved in 100 parts of water.
5. 25 parts of copper nitrate containing 3 mols of water are dissolved in 100 parts of water. Instead of using copper nitrate alone a corresponding mixture of copper nitrate and nickel nitrate, or copper nitrate, nickel nitrate and cobalt nitrate can be used.

The freshly precipitated iron hydroxide is kneaded into the plumbite and aluminate solution and then the thorium nitrate and copper nitrate solutions added. The reaction product obtained is thoroughly pressed and dried at 80 to 90° C. followed by fragmentation.

The product is a contact mass containing potassium, sodium, aluminum, thorium, lead and copper highly diluted with freshly precipitated iron oxide, and is well suited for the catalytic oxidation of the impurities of crude anthracene, especially for the total combustion of carbazol whereby a high grade anthracene is obtained. Anthracene presscake of 26-35% anthracene content is uniformly vaporized with air in the ration of 1:30 to 1:35 and passed over the contact mass at 380 to 420° C., whereby a 75 to 80% anthracene is immediately obtained containing as the main impurity phenanthrene which later can easily be separated from anthracene by recrystallization using well known solvents such as toluol, solvent naphtha, etc. The anthracene after a single recrystallization is of excellent quality containing between 95-97% anthracene, and once more recrystallized is nearly chemically pure.

Crude anthraquinone, for example, produced by the vapor phase oxidation of crude anthracene, may also be purified by passing its vapors admixed with air over the contact mass under the reaction conditions described above. Anthraquinone of high chemical purity is obtained.

*Example 15*

18 parts of vanadium pentoxide are suspended in 300 parts of water rendered weakly acid with concentrated sulfuric acid and reduced with sulfur dioxide to blue vanadyl sulfate in the usual manner. The solution is boiled and concentrated to 150 parts of water. 10 parts of aluminum oxide are transformed into potassium aluminate with 5 N. potassium hydroxide solution. $\frac{1}{3}$ of the vanadyl sulfate solution is treated with 10 N. potassium hydroxide solution to transform it into the coffee-brown potassium vanadite which is then mixed with the sodium aluminate solution and 100 parts of infusorial earth added. Thereupon the remaining $\frac{2}{3}$ of the vanadyl sulfate solution is added with vigorous agitation. The final reaction product should remain strongly alkaline to litmus.

The product is pressed, dried as usual under 100° C., broken into fragments and then sprayed with 10% sulfuric acid until the so-called salt-like body is formed. During the spraying the fragments should preferably be heated and stirred.

The product obtained after treatment with air at 400° C. is an excellent catalyst for the vapor phase oxidation of naphthalene to phthalic anhydride when a mixture of naphthalene vapors and air in the proportion of 1 to 18 by weight is passed over the catalyst at 380–410° C.

*Example 16*

A base exchange body is prepared as described in Example 15 but instead of causing it to react with sulfuric acid to form a salt-like body it is digested for a considerable period of time with a 5% copper nitrate solution whereby part of the alkali is substituted by copper. The product thus obtained is an excellent catalyst for the oxidation of methyl alcohol to formaldehyde in the vapor phase at 360–400° C., a mixture of gaseous methyl alcohol and air in the proportion of 1 to 10 being passed over the catalyst.

*Example 17*

A base exchange body is prepared as described in Example 16 but instead of digesting with copper nitrate a 5% solution of ferric nitrate is used in order to substitute as much as possible of the alkali by ferric iron. The product thus obtained is an excellent catalyst for the catalytic purification of coal tar ammonia, the ammonia vapors mixed with air at 360–450° being passed over the catalyst whereby the organic impurities are oxidized to carbon dioxide and water with the production of some elementary nitrogen.

Example 18

A base exchange body is prepared as described in Example 15 but instead of using 10 parts of aluminum oxide, 20 parts of aluminum oxide and a corresponding amount of potassium hydroxide is used, the potassium aluminate solution being diluted with 60–70 parts of kieselguhr, pumice fragments or quartz fragments, and the alkali base exchange body then being neutralized with sulfuric acid to form a salt-like body. The product thus obtained is an excellent catalyst for the catalytic oxidation of benzol, toluol, phenol and tar acids to maleic acid. The gaseous mixture of these aromatic hydrocarbons or compounds and air in the proportion of 1 to 20 are passed over the catalyst at 360–450° C.

Example 19

A vanadyl base exchange body is prepared by suspending 20 parts of $V_2O_5$ in 500 parts of water, adding a little concentrated sulfuric acid and then reducing the $V_2O_5$ with gases containing sulfur dioxide at the boiling point until it is completely transformed into blue vanadyl sulfate. The vanadyl sulfate solution is then divided into two parts, half of which is treated at 50–60° C. with sufficient 5 N.KOH to form a clear coffee-brown solution of potassium vanadite, to which 50 parts of "Celite" earth is added as a diluent. The second half of the original solution is then added with vigorous agitation, care being taken that the alkalinity remains between phenolphthalein red and litmus blue. The gelatinous product is sucked but not dried and constitutes a vanadyl base exchange body.

10.2 parts of freshly precipitated aluminum oxide are brought into solution with 40 parts of 100% KOH in 200 parts of water. The vanadyl base exchange body described above is then stirred into the solution and a 10% aqueous solution containing 37 parts of ferric sulfate with 9 mols of water or 44.4 parts of aluminum sulfate with 18 mols of water or a mixture of the two, is added to the aluminate mixture with vigorous agitation. The reaction product produced, which is an aluminum iron base exchange body and which does not possess effective catalytic properties for the catalytic oxidation of most organic compounds, is diluted with the catalytically active vanadyl base exchange body and is thereby transformed into a highly active catalyst for the above referred to processes. The reaction product is sucked, pressed, washed with 300–400 parts of water, dried and broken into fragments. The fragments may be treated with 5% copper sulfate, silver nitrate, cobalt nitrate or iron nitrate solutions to partly replace the alkali with these metals. The product may also be treated with salts of the metal oxygen acids of the fifth and sixth groups, preferably with a 1% ammonium vanadate solution, resulting in a so-called salt-like body after the soluble components have been washed out.

The products are calcined with air or gases containing carbon dioxide at 400° C., the calcination temperature being permitted to rise gradually in order to prevent undesirable changes in the structure of the base exchange body. After this preliminary calcination the product may be preferably treated with 3–5% burner gases at 450° C. and is then ready for use.

The contact mass so obtained is well suited for the catalytic oxidation of organic compounds, such a naphthalene to phthalic anhydride and maleic acid, anthracene to anthraquinone, acenaphthene to naphthalic anhydride, toluol and its substitution products to the corresponding benzaldehydes or benzoic acids or methyl alcohol to formaldehyde. The vapors of the organic compounds mixed with air or other oxygen containing gases, such as, for example, $CO_2$ and oxygen, in the proportion of from 1:20 to 1:30 are passed over the catalyst at 350–420° C.

In this example the aluminum iron base exchange body may be considered as a complex stabilizer for the catalyst in these reactions. In order to promote or tune the stabilizing action of the catalyst various stabilizer promoters can be added in the form of silicates or heavy metal oxides, such as ferric oxide, copper oxide, titanium dioxide, manganese dioxide, zirconium dioxide, cerium dioxide, beryllium oxide, calcium oxide, cobalt oxide or thorium dioxide. They may be added singly or in mixtures and may advantageously be formed in a nascent state. The amount of the stabilizer promoter added depends on the effect desired; in general, from 2–5% of such stabilizer promoters, gives good results. These stabilizer promoters, of course, may be added in the same manner as any other diluent as has been generally described in the introductory portion of this application.

A different method of introducing the stabilizer promoters consists in replacing part or all of the metal salt components of the base exchange body with corresponding amounts of beryllium sulfate, silver nitrate, nickel sulfate, cadmium sulfate or similar mineral acid salts of these bases.

In many cases it is desirable to neutralize excess alkali in the reaction products with 5% mineral acid such as hydrochloric acid, sulfuric acid, nitric acid or the like until the alkalinity has been brought to the desired point. Other catalytically active base exchange bodies, may, of course, be introduced as diluents instead of the one described.

Example 20

20 parts of 33° Bé. sodium waterglass solution are diluted with 10 volumes of water and sufficient 5% iron sulfate, copper sulfate or silver nitrate solution is added to bring about a neutral reaction to litmus. The precipitate is sucked and thoroughly washed in water and constitutes silicates of the metals used which can be further worked up without drying. 16 parts of $V_2O_5$ are then treated with sufficient ½ N.KOH at an elevated temperature to dissolve the $V_2O_5$ as potassium metavanadate. To this solution is added 40 parts of 100% KOH dissolved in 200 parts of water and 60 parts of infusorial earth or twice as much quartz or pulverized silicate rock are stirred in. The heavy metal silicate described above is then also stirred in to produce a uniform distribution. 66 parts of aluminum sulfate with 18 mols of water or an equivalent amount of beryllium sulfate or cadmium sulfate are dissolved in 250 parts of water and the solution is gradually poured into the suspension at 40–60° C. If necessary, 2½–5% sulfuric acid can be added to bring the reaction to the desired alkalinity or neutrality to phenolphthalein in order to get the maximum yield. The reaction product obtained is then pressed and washed with 300 parts of water.

A product is obtained which is an aluminum base exchange body in which the $V_2O_5$ is present partly in chemically combined form and which product also contains as diluents the heavy metal silicate which may be considered as a stabilizer promoter to tone down the composite stabilizer formed by the aluminum base exchange body. The contact mass is dried below 100° C. in the usual manner, broken into fragments, and then calcined with air at 400° C., and constitutes an effective catalyst for the catalytic oxidation of organic compounds to valuable intermediate oxidation products.

By suitably varying the amount of washing a contact mass can be produced which is effective for the vapor phase oxidation of ortho- and parachlortoluol to the corresponding benzoic acids. The washing, of course, affects the amount of alkali present and correspondingly the amount of alkali metal sulfate formed during the preliminary treatment. The alkali metal sulfate, of course, is one of the most effective stabilizers and the activity of the catalyst can be varied by varying the percentages of the stabilizer which is permitted to remain in the contact mass.

*Example 21*

15 parts of $V_2O_5$ are dissolved in ½ N.KOH solution in the form of potassium metavanadate. 5 parts of freshly precipitated aluminum oxide are dissolved up in 35 to 40 parts of 100% KOH dissolved in 250 parts of water forming a potassium aluminate solution. The two solutions are poured together and a mixture of 20 parts $TiO_2$ and 50 parts of kieselguhr are stirred in. Thereupon 17 parts of aluminum sulfate with 18 mols of water mixed with 20 parts of ferric sulfate having 9 mols of water are dissolved in about 300 parts of water and the solution is then gradually poured into the aluminate-vanadate suspension at temperatures of about 50 to 70° C. 5% sulfuric acid is then gradually added until the desired alkalinity or neutrality to phenolphthalein is obtained.

The reaction product produced is a vanadium-aluminum-iron base exchange body which contains as a diluent titanium oxide and kieselguhr. The product is freed from the mother liquor in the usual manner, washed with 3 to 5 times its weight of water and then dried at temperatures below 100° C.

The product is then broken in fragments and is a very efficient contact mass for the catalytic oxidation of anthracene to anthraquinone, acenaphthene to naphthalic anhydride, fluorene to fluorenone, phenanthrene to phenanthraquinone, methyl alcohol to formaldehyde and ethylenechlorhydrine to chloracetic acid. The organic substances mixed with air in the ratio of 1:15 to 1:30 are passed over the catalyst at 360 to 400° C. The yields of anthracene and naphthalic anhydride are very good.

In this contact mass composition part of the base exchange body components may be considered as stabilizers for the catalytically effective components and the titanium dioxide appears to act as a promoter for these stabilizers. The contact mass can also be treated with water after drying in order to hydrate it and then calcined before use.

*Example 22*

A potassium vanadate solution is prepared by transforming 15 parts of $V_2O_5$ into the potassium metavanadate with ½ N.KOH and then diluting with 400 parts of water. 10 parts $MnO_2$ and 50 parts of kieselguhr or pumice meal are then stirred in. To these mixtures are added either 10 parts of freshly precipitated aluminum oxide or 5 parts of aluminum oxide and 8 parts of freshly precipitated ferric oxide, with sufficient N.KOH solution to cause the entire mixture to react neutral or weakly alkaline to phenolphthalein. The reaction mixture is then sucked and worked up in the usual manner and an efficient contact mass for the catalytic oxidation of anthracene to anthraquinone, and also for other catalytic organic oxidations, is obtained.

*Example 23*

8 parts of $V_2O_5$ and 5.1 parts $WO_3$ are dissolved in a 2 N.KOH solution containing 26 parts of 90% KOH. 80 parts "Celite" brick refuse or other acid resistant materials rich in silica are added. 22 parts of $Al_2(SO_4)_3$ 18 aq. are dissolved in about 100 parts of water. The suspension 1 and the solution 2 are mixed together in such a way that the solution is added in small portions whereby care is taken that the reaction mixture remains strongly alkaline to litmus. The paste obtained is freed from the mother liquor by pressing and is dried afterwards at temperatures under 100° C. and then broken in small pieces suitable for catalysis. After drying it may be desirable sometimes to trickle water over the broken fragments in order to wash out the excess of salts formed in the preparation of this body.

The dried, diluted base exchange body containing $V_2O_5$, $WO_3$ and $Al_2O_3$ in non-exchangeable form is advantageously treated at 420 to 500° C. with gases containing strongly diluted $SO_2$ and oxygen and then is blown out by air. The contact mass so obtained is well suited for the catalytic oxidation of cresol to salicylaldehyde and salicylic acid; benzene to benzoquinone; benzene, toluene, phenol, tar phenols and furfural to maleic and fumaric acid, when these organic compounds are mixed with air in the ratio of 1:25 by weight and the mixture is passed over the contact mass at 350 to 440° C.

Instead of using $Al_2(SO_4)_3$ as the salt component of the base exchange body, the equivalent amount of titanium sulfate, zirconium sulfate, cadmium sulfate or their mixtures can be used.

Instead of $WO_3$, $MoO_3$ and $Ta_2O_5$ can be used to prepare contact masses of similar catalytic efficiency.

In the preparation of such contact masses the $V_2O_5$ content can also be replaced partly or wholly by a corresponding amount of other oxides of the elements of the 5th and 6th groups of the periodic system whereby well tuned contact masses for such specific oxidation reactions are obtained. Contact masses which do not contain $V_2O_5$ do not have a very high catalytic efficiency for total combustion so that such contact masses can be used especially for the catalytic oxidation of eugenol and isoeugenol to vanillin and vanillic acid under the reaction conditions described in the prior part of this example.

*Example 24*

12 parts of $V_2O_5$ are suspended in 250 parts of water to form a slurry, acidified with 5 parts of concentrated sulfuric acid and then reduced to the blue vanadyl sulfate in the usual manner, for example, by means of gases containing $SO_2$ which are passed into the solution at the boiling point. 107 parts of waterglass solution at 33° Bé. are then diluted with 200 parts of water and about 60 parts of "Celite" stirred in. The waterglass solution is then poured into the vanadyl sulfate solution with vigorous agitation, precipitating out vanadyl silicate. Care should be taken that after all of the solutions have reacted the resulting mixture must be made neutral to litmus, if necessary with the help of small amounts of N. sulfuric acid. 10 parts of freshly precipitated aluminum oxide are treated with sufficient ½ N.KOH solution to dissolve up the aluminum oxide in the form of potassium aluminate and to provide a 10% excess of KOH.

37 parts of $Fe_2(SO_4)_3$ 9 aq. are dissolved in 250 to 300 parts of water.

Instead of using this latter salt component for the formation of the base exchange body corresponding amounts of titanium sulfate, aluminum sulfate, copper nitrate, cobalt nitrate, nickel sulfate, thorium nitrate, silver nitrate, zirconium nitrate, cerium nitrate or a mixture of them, can be used.

The vanadyl silicate is then stirred into the aluminate solution diluted with "Celite" and thereupon the above mentioned salt component or components are added producing a base exchange body in which the vanadyl silicate is homogeneously incorporated as a diluent.

The reaction product is treated in the usual way by pressing and drying below 100° C. and is broken into fragments. After hydration by trickling water over the fragments the alkali of the base exchangeable part can be replaced by iron, using a 5% iron sulfate solution. Replacing the alkali of the base exchange by copper, silver, nickel and lead using a 5 to 10% solution of the corresponding salts or their mixtures, favorably influences the catalytic efficiency of such contact masses for the catalytic oxidation of organic compounds.

Treatment with ammonium vanadate or molydate for the formation of the so-called salt-like body helps to enhance the catalytic efficiency for specific oxidation reactions and also the resistance of such contact masses against high temperatures often obtaining in these processes.

Contact masses containing such components are well suited for the catalytic oxidation of anthracene to anthraquinone, phenanthrene to phenanthraquinone and diphenic acid, acenaphthene to acenaphthylene, acenaphthaquinone, bisacenaphthylidenedione, naphthaldehydic acid, naphthalic anhydride and hemimellitic acid.

These organic compounds are mixed with air in the ratio of 1:35 by weight and are passed over the contact mass at 340 to 440° C.

*Example 25*

10 parts of freshly precipitated $Al_2O_3$ are transformed into potassium aluminate with 2 N. potassium hydroxide solution. A 10% excess of alkali should be present. 66.6 parts $Al_2(SO_4)_3$ $18H_2O$ are dissolved in about 200 parts of water. 70 to 80 parts of "Celite" brick refuse or other comminuted acid resistant materials such as glaucosil or neutral or base exchanging polysilicates are stirred into the aluminate solution. The aluminum sulfate solution is then gradually added in small portions with vigorous agitation until the mixture still shows a strong alkalinity to litmus or preferably neutrality or weak alkalinity to phenolphthalein.

The reaction product obtained is freed from mother liquor and dried at temperatures below 100° C. The material thus obtained is broken into small fragments and consists of a catalytically ineffective base exchanging body diluted with inactive materials. The fragments are hydrated by trickling water over them and then the exchangeable alkali base is partly replaced by silver in the usual way, using a 5% nitrate solution. After this treatment the base exchange body is treated with 5 to 10% metallate solutions of the elements of the 5th and 6th groups of the periodic system, especially with soluble vanadate solutions such as ammonium vanadate and potassium vanadate solutions in order to form the vanadate of the diluted base exchange body containing silver in the exchangeable part.

After again drying, the particles, which now possess perfectly uniform yellow color, are calcined with air in order to dehydrate the reaction product.

The aluminate component can be wholly or partly replaced by other amphoteric metallates such as zinc, beryllium and cadmium, alone or in admixture. The aluminum sulfate component as the salt component of the base exchange body can also be replaced wholly or partly by salt solutions such as salts of Fe, Cu, Ag, Ce, Mn, Ti, singly or in admixture. Such composite contact masses are very efficient for the catalytic oxidation of methyl alcohol and methane to formaldehyde, benzene and tar phenols to maleic acid, ethyl alcohol and ethylene chlorhydrin to the corresponding acetic acids. These organic compounds are mixed with air or other oxygen containing gases such as $O_2$ plus $CO_2$ in the ratio of 1:30 by weight and passed over such contact masses at 330 to 400° C.

In order to carry out such catalytic oxidations in the vapor phase to produce valuable intermediate compounds in some cases it is advantageous to re-circulate the gases using carbon dioxide and $O_2$ whereby fresh $O_2$ is added gradually during this circulation in amounts corresponding to the $O_2$ used up in the process.

*Example 26*

20 parts of 33° Bé. sodium waterglass solution are diluted with 15 to 20 volumes of water and 60 to 80 parts of infusorial earth are added. Sufficient 5% iron sulfate, copper sulfate, silver nitrate, calcium chloride, strontium chloride, and manganese nitrate solution, singly or in admixture, are added with vigorous agitation to bring about a neutral reaction to litmus. The precipitate is sucked and thoroughly washed with water to get the alkali metal salt out of it and then constitutes diluted neutral silicates of the metals used which can be further worked up without drying.

10 parts of $Al_2O_3$, freshly precipitated, are transformed into potassium aluminate using a sufficient amount of 2 N.KOH solution to provide an excess alkali amounting to about 10 to 15%. The diluted silicates described above are kneaded into this solution. 50 parts of $Al_2(SO_4)_3$ $18H_2O$ are dissolved in about 200 parts of water. The latter solution is then kneaded with the aluminate mixture and after addition of all the solution, an alkaline or neutral reaction to phenolphthalein should be obtained.

The diluted reaction product so obtained is freed from mother liquor by pressing, dried at temperatures under 100° C. and broken in pieces. The dried fragments are leached out by trickling water over them and then are treated with a 5% vanadyl sulfate solution, chromium nitrate solution of uranyl nitrate solution or a mixture of them, in order to exchange, as far as possible, the alkali for these radicals. Thereafter the product is impregnated with a dilute potassium or ammonium vanadate solution in order to form the so-called salt-like body, that is, the vanadate of the vanadyl base exchange body diluted with silicates and infusorial earth.

After drying and calcining, the contact mass so obtained is very efficient for the catalytic oxidation of anthracene to anthraquinone and acenaphthene to naphthalic anhydride when the vapors of the hydrocarbons, mixed with air in the ratio of 1:20 by weight, are passed over the catalyst at 340 to 420° C.

The silicates act in this contact mass as stabilizer promoters in the reaction and at the same time render the contact mass highly resistant to high temperatures often obtaining in such catalytic oxidation processes.

Instead of neutral silicates 5 to 10% of $TiO_2$, $Fe_2O_3$ or $MnO$, singly or in admixture, can be used, the amount depending on the diluent.

*Example 27*

1. A mixture of 10 parts of $V_2O_5$ plus 4 parts of $WO_3$ are dissolved in 300 parts of diluted KOH solution containing 10.5 parts of 90% KOH. About 90 parts "Celite" brick refuse or a mixture of comminuted quartz and diatomaceous earth equal in volume to the "Celite" brick refuse are added to this solution with vigorous agitation. The suspension is heated up to 80–90° C. and is gradually made faintly acid to congo using 2 N. sulfuric acid in order to precipitate out $V_2O_5$ and $WO_3$ in the diluent. The mixture obtained is then dried.

2. 22 parts of $Al_2(SO_4)_3$ 18 aq. are transformed in the usual way, with the help of ammonia, to $Al(OH)_3$ and the wet $Al(OH)_3$ is dissolved in 14 parts of 90% KOH using in 80 parts of water to form the corresponding aluminate.

The dried material obtained in #1 is impregnated with the aluminate solution by kneading thoroughly and is then formed into suitable granules. These granules are then dried at temperatures preferably under 100° C. in the presence of $CO_2$ containing gases, whereby a diluted base exchange body is obtained containing $V_2O_5$, $WO_3$ and $Al_2O_3$ in non-exchangeable form.

The contact mass so obtained is calcined with air and then if necessary sprayed with mineral acids such as $H_2SO_4$, HCl, $HNO_3$, in order to form a so-called salt-like body. Sometimes it is preferable to saturate with chlorine gas. Contact masses thus obtained are very efficient for the catalytic oxidation of naphthalene to alphanaphthaquinone and phthalic anhydride when treated with gaseous naphthalene mixed with air in the ratios of 1:15 to 1:20 by weight at 370 to 420° C. for the manufacture of phthalic anhydride and in ratios of 1:40 to 1:60 for the manufacture of alphanaphthaquinone.

Instead of $V_2O_5$ and $WO_3$ other catalytically effective components can be used in this contact mass such as $V_2O_4$ and $MoO_3$. Instead of using potassium aluminate solution other metallates of elements with amphoteric property can be used such as Cd and Be.

Example 28

1. 12 parts of $V_2O_5$ are dissolved in 150 to 200 parts of water containing 10 parts of 90% KOH.

2. 6 parts of $CuSO_4$ 5 aq. are dissolved in 150 to 200 parts of water and sufficient concentrated ammonia solution is added until a clear blue solution of the cuprammonium complex is obtained.

3. 5 parts of freshly precipitated $Al_2O_3$ are dissolved in the corresponding amount of 2 N.KOH solution in order to form the potassium aluminate.

The solutions 2 and 3 are poured together and, under vigorous agitation, solution #1 is poured in and, with the help of a thin stream of 2 $N.H_2SO_4$, the reaction mixture is made slightly alkaline or neutral to phenolphthalein. The product so obtained is freed from the mother liquor by filtering and pressing. The presscake is dried and is then broken in small fragments.

This contact mass is well suited for the catalytic oxidation of methyl alcohol to formaldehyde and benzol or phenol to maleic acid under reaction conditions as described in the foregoing examples.

Example 29

Pea sized quartz fragments are treated with 20% solution of hydrofluoric acid in order to etch their surface. On these carrier fragments is formed a base exchange body containing platinum, the amount of coating being about 10% by volume of the carrier fragments.

Instead of forming the base exchange body in situ on fragments the finished base exchange body may be pulverized and afterwards coated on the carrier fragments with the help of adhesive substances such as waterglass $MgSO_4$, KOH, NaOH, and the like.

The base exchange body is prepared as follows:

5 parts of $Al_2O_3$ are transformed into potassium aluminate using a 5 N. potassium hydroxide solution. After the formation of the potassium aluminate an excess of alkali amounting to 10–15% should be present. 4 parts of $H_2PtCl_6$ in the form of 10% solution are then added to the aluminate solution under vigorous agitation. 22 parts of $Fe_2(SO_4)_3$ 9 aq. are dissolved in 200 parts of water and are then added gradually with strong agitation, care being taken that the resulting reaction product remains slightly alkaline or neutral to phenolphthalein.

The base exchange body obtained containing aluminum, iron and platinum is non-exchangeable form is freed from the mother liquor by pressing and dried.

Instead of an undiluted base exchange body a diluted base exchange body may be used, especially when using powdered quartz or material rich in silicia such as colloidal $SiO_2$, kieselguhr and the like, as diluents, and is an effective catalyst for the selective purification of tar ammonia in order to burn out the organic impurities and transform the inorganic impurities such as sulphur to non-volatile compounds whereby ammonia of a high purity is obtained. Tar ammonia is mixed with air in such a ratio that the excess of oxygen based on the amount of impurities is sufficient to be able to burn or transform all the impurities. The best working temperatures are between 320 and 420° C.

Example 30

6.7 parts of freshly precipitated $Al_2O_3$ are mixed with 12 parts of $V_2O_5$ and sufficient crystallized oxalic acid or other reducing agents, such as powdered carbon, are added in order to reduce the $V_2O_5$ in the process to $V_2O_4$. 11 parts of 100% KOH or 13 parts of $K_2CO_3$ are thoroughly mixed with the other components. The entire mixture is then heated up to the sintering point or to incipient melting. The melted mass is crushed to small pieces and leached with water in order to remove excessive alkali. The catalytically active base exchange body so obtained is ground and then embedded in a catalytically inactive zeolite body as follows:

90 parts of 33° Bé. waterglass are diluted with 5 to 10 volumes of water and the base exchange body obtained, as described above, together with 80 parts of infusorial earth, are added with vigorous stirring in order to obtain a good distribution. 60 parts of aluminum sulfate with 18 mols of water are dissolved in 200 parts of water and sufficient 10 N. potassium hydroxide solution is added to dissolve up the aluminum hydroxide which is at first precipitated, forming a potassium aluminate solution.

The aluminate solution is then stirred into the suspension and the mixture heated up to about 60 to 65° C. A gelatinous precipitate is obtained almost at once and is increased by the gradual addition to 2 N. sulfuric acid. Care should be taken, however, that alkalinity to litmus or neutrality to phenolphthalein is maintained. The stirring is continued for an hour, during which time the mixture is gradually permitted to cool down to room temperature. The gelatinous precipitate obtained is pressed and washed with 200 parts of water in small portions. The filter cake is then dried and broken into fragments of suitable size. The mass so obtained, after careful calcination for purposes of dehydration, constitutes an efficient contact mass for the catalytic oxidation of organic compounds such as toluol to benzaldehyde and benzoic acid when toluol vapors mixed with air in the ratio of 1:25 parts by weight are passed over the contact mass at 360 to 380° C. It is sometimes advantageous to add superheated steam to the gaseous reaction mixture before passing over the contact mass.

Example 31

60 to 80 parts of "Celite" brick refuse are impregnated with an ammoniacal silver vanadate solution prepared by causing 18 parts of $V_2O_5$ in the form of sodium metavanadate dissolved in 250 parts of water to react with 34 parts of silver nitrate also dissolved in about 250 parts of water. The yellow silver vanadate which is precipitated is then separated from the mother liquor in the usual manner and suspended in about 100 parts of water in the form of a slurry. 20% ammonia water is added until all of the silver vanadate dissolves. After the impregnation of the "Celite" brick refuse with this solution, the impregnated material is warmed to completely drive off the ammonia.

7.75 parts of $WO_3$ are dissolved with ½ N.KOH solution to potassium tungstate.

3.4 parts freshly precipitated $Al_2O_3$ are dissolved in N.KOH solution in order to form the potassium aluminate.

The two solutions are poured together and the diluent impregnated with silver vanadate is added with vigorous stirring. After formation of a good mixture the diluted base exchange body is precipitated out with the help of $N.H_2SO_4$ which is added gradually, care being taken that the final reaction product reacts alkaline or neutral to phenolphthalein. The reaction mixture is freed from the mother liquor by suction and is washed with about 200 parts of water and then dried at temperatures preferably below 100° C. The dried precipitate is broken into small fragments and then carefully calcined with air at about 400° C.

The calcined contact mass, after pretreating with diluted burner gases for a short time, is very efficient for the catalytic oxidation of ortho- and parachlor- or bromtoluene, dichlortoluene, chlorbromtoluene, nitrotoluene, chlornitrotoluene, bromnitrotoluene to the corresponding aldehydes and acids; and xylenes, pseudocumene, mesitylene, paracymene and their derivatives to the corresponding aldehydes and acids.

These organic compounds are mixed with air in the ratio of 1:35 by weight and passed over the contact mass at temperatures of 330 to 380° C. a recirculation process being advantageously used for high yields.

Instead of embedding silver vanadate other vanadates can be used, especially vanadates of heavy metals such as copper, iron, cobalt and the like, in which case contact masses for the catalytic oxidation of anthracene to anthraquinone are obtained.

For the preparation of the base exchange body other catalytically active components such as $V_2O_5$, $V_2O_4$, $MoO_3$, $Ta_2O_3$, may be used and instead of aluminum, other amphoteric metal oxides can be used, effective catalysts being thus obtained. Several of such contact mass compositions are effective catalysts for the catalytic purification of organic compounds, whereby the impurities are selectively burned out, e. g., crude naphthalene and crude benzene can be easily purified in such a way. Sulphur compounds and oily impurities such as paraffins can easily be burned to gaseous reaction products under reaction conditions as described in the foregoing examples.

Example 32

6 parts of $V_2O_5$ are suspended in 150 parts of water to form a slurry, acidified with 5 parts of concentrated sulfuric acid and then reduced to the blue vanadyl sulfate in the usual manner, for example, by means of gases containing $SO_2$ which are passed into the solution at the boiling temperature. 54 parts of waterglass solution of 33° Bé. are diluted with 150 parts of water and about 60 parts of "Celite" brick refuse are stirred in. The waterglass solution is then poured into the vanadyl sulfate solution with vigorous agitation, precipitating out vanadyl silicate. Care should be taken that after all the solutions have reacted, the resulting mixture must be made neutral to litmus, if necessary with the help of small amounts of N. sulfuric acid.

10 parts of freshly precipitated aluminum oxide are treated with sufficient ½ N. KOH solution to dissolve up the aluminum oxide in the form of potassium aluminate and to provide a 5–10% excess of KOH.

6 parts of $V_2O_5$ are transformed as described above, to vanadyl sulfate and dissolved in about 250 to 300 parts of water.

The vanadyl silicate obtained above is stirred in the vanadyl sulfate solution and the potassium aluminate is added with vigorous agitation, whereby a base exchange body is obtained containing $V_2O_4$ and $Al_2O_3$ in non-exchangeable form diluted with vanadyl silicate and "Celite" brick refuse. In adding the potassium aluminate, care should be taken that after all the aluminate is added the reaction mixture reacts at least neutral or alkaline to phenolphthalein. If necessary small amounts of additional alkali can be added.

The reaction mixture is separated from the mother liquor in the usual way and then dried and broken into suitable pieces. After calcination with air at 400° C. in order to dehydrate the contact mass, diluted $SO_2$ gases are passed over the contact mass to neutralize the alkali content of the base exchange body.

The pretreated contact mass is very efficient for the catalytic oxidation of naphthalene to alphanaphthaquinone and phthalic anhydride when naphthalene vapors mixed with air in the ratio of 1:40 for the manufacture of alphanaphthaquinone and 1:16 for the manufacture of phthalic anhydride are passed over the contact mass at 370 to 400° C.

In example 32 the metallate solution is added to the metal salt solution instead of vice versa as in the other examples. Such a method of production is included in the present invention but for most catalysts I prefer the converse method since when the metal salt solutions are added to the metallate solutions the alkalinity of the latter assures the maintenance of an alkaline reaction thruout the mixing.

In the claims the term "non-specific catalyst" is used to define a catalyst which acting by itself would not permit commercial yields in the particular reaction for which the contact mass is being used, but which is a catalyst for other reactions either of the same type or different types. It should be understood that the expression as used in the claims is not intended to have any other meaning.

What is claimed as new is:

1. A method of oxidizing organic compounds, which comprises subjecting them to reaction with an oxidizing agent in the presence of a catalyst which contains a non-silicious base exchange body.

2. A method of oxidizing organic compounds, which comprises passing the vapors of the compounds mixed with an oxidizing gas at an elevated temperature over a catalyst which contains a non-silicious base exchange body.

3. A method of oxidizing organic compounds, which comprises passing the vapors of the compounds mixed with an oxidizing gas at an elevated temperature over a catalyst which contains a non-silicious base exchange body and a compound of an element of the group which includes alkali metals, alkaline earth metals and earth metals whose oxides are not reducible by hydrogen.

4. A method of oxidizing organic compounds, which comprises subjecting them to reaction with an oxidizing agent in the presence of a catalyst which contains a diluted, non-silicious base exchange body.

5. A method of oxidizing organic compounds, which comprises subjecting them to reaction with an oxidizing agent in the presence of a catalyst which contains a diluted, non-silicious base exchange body, at least part of the catalytically active components being chemically combined with the base exchange body.

6. A method of oxidizing organic compounds, which comprises subjecting them to reaction with an oxidizing agent in the presence of a catalyst which contains a diluted, non-silicious base exchange body, at least part of the catalytically active components being present in the diluent.

7. A method of oxidizing organic compounds, which comprises subjecting them to reaction with an oxidizing agent in the presence of a catalyst containing a non-silicious base exchange body, diluted or undiluted, at least part of the catalytically active components being vanadium compounds.

8. A method of oxidizing organic compounds, which comprises passing the vapors of the compounds mixed with an oxidizing gas at an elevated temperature over a catalyst which contains a non-silicious base exchange body, at least one compound of an element of the group which includes alkali metals, alkaline earth metals and earth metals whose oxides are not reducible by hydrogen and at least one solid, non-specific, vapor phase, chemical catalyst.

9. A method of oxidizing aliphatic compounds, which comprises passing the vapors of the compounds mixed with an oxidizing gas at an elevated temperature over a contact mass which contains a non-silicious base exchange body.

10. A method of oxidizing aliphatic compounds, which comprises passing the vapors of the compounds mixed with an oxidizing gas at an elevated temperature over a contact mass which contains a non-silicious base exchange body and at least one compound of an element of the group which includes alkali metals, alkaline earth metals and earth metals whose oxides are not reducible by hydrogen.

11. A method of oxidizing aliphatic compounds, which comprises passing the vapors of the compounds mixed with an oxidizing gas at an elevated temperature over a contact mass which contains a non-silicious base exchange body and at least one solid, non-specific, vapor phase, chemical catalyst.

12. A method of oxidizing an aliphatic alcohol to a carbonyl compound, which comprises passing the vapors of the alcohol mixed with an oxidizing gas at an elevated temperature over a contact mass which contains a non-silicious base exchange body.

13. A method of oxidizing an aliphatic alcohol to a carbonyl compound, which comprises passing the vapors of the alcohol mixed with an oxidizing gas at an elevated temperature over a contact mass which contains a non-silicious base exchange body and at least one compound of an element of the group which includes alkali metals, alkaline earth metals and earth metals whose oxides are not reducible by hydrogen.

14. A method of oxidizing an aliphatic alcohol to a carbonyl compound, which comprises passing the vapors of the alcohol mixed with an oxidizing gas at an elevated temperature over a contact mass which contains a non-silicious base exchange body and at least one solid, non-specific, vapor phase, chemical catalyst.

15. A method of oxidizing an aliphatic alcohol to an aldehyde, which comprises passing the vapors of the alcohol mixed with an oxidizing gas at an elevated temperature over a contact mass containing a non-silicious base exchange body and having an activity insufficient to oxidize a major portion of the alcohol to the corresponding acid.

16. A method of oxidizing an aliphatic alcohol to an aldehyde, which comprises passing the vapors of the alcohol mixed with an oxidizing gas at an elevated temperature over a contact mass containing a non-silicious base exchange body and having an activity insufficient to oxidize a major portion of the alcohol to the corresponding acid, the contact mass containing a compound of an element of the group which includes alkali metals, alkaline earth metals and earth metals whose oxides are not reducible by hydrogen.

17. A method of oxidizing an aliphatic alcohol to an aldehyde, which comprises passing the vapors of the alcohol mixed with an oxidizing gas at an elevated temperature over a contact mass containing a non-silicious base exchange body and having an activity insufficient to oxidize a major portion of the alcohol to the corresponding acid, the contact mass containing a compound of an element of the group which includes alkali metals, alkaline earth metals and earth metals whose oxides are not reducible by hydrogen and at least one solid, non-specific, vapor phase, chemical catalyst.

18. A method of oxidizing a monohydric paraffin alcohol to a corresponding aldehyde, which comprises passing the vapors of the alcohol mixed with an oxidizing gas at an elevated temperature over a contact mass containing a non-silicious base exchange body and having an activity insufficient to oxidize a major portion of the alcohol to the corresponding acid.

19. A method of oxidizing a monohydric paraffin alcohol to a corresponding aldehyde, which comprises passing the vapors of the alcohol mixed with an oxidizing gas at an elevated temperature over a contact mass containing a non-silicious base exchange body and having an activity insufficient to oxidize a major portion of the alcohol to the corresponding acid, the contact mass containing a compound of an element of the group which includes alkali metals, alkaline earth metals and earth metals whose oxides are not reducible by hydrogen.

20. A method of oxidizing a monohydric paraffin alcohol to a corresponding aldehyde, which comprises passing the vapors of the alcohol mixed with an oxidizing gas at an elevated temperature over a contact mass containing a non-silicious base exchange body and having an activity insufficient to oxidize a major portion of the alcohol to the corresponding acid, the contact mass containing a compound of an element of the group which includes alkali metals, alkaline earth metals and earth metals whose oxides are not reducible by hydrogen and at least one solid, non-specific, vapor phase, chemical catalyst.

21. A method of oxidizing methyl alcohol to formaldehyde, which comprises passing the vapors of methyl alcohol admixed with an oxidizing gas at an elevated temperature over a contact mass containing a non-silicious base exchange body and being insufficiently active to oxidize a major portion of the alcohol to formic acid.

22. A method of oxidizing methyl alcohol to formaldehyde, which comprises passing the vapors of methyl alcohol admixed with an oxidizing gas at an elevated temperature over a contact mass containing a non-silicious base exchange body and being insufficiently active to oxidize a major portion of the alcohol to formic acid, the contact mass also containing a compound of an element of the group which includes alkali metals, alkaline earth metals and earth metals whose oxides are not reducible by hydrogen.

23. A method of oxidizing methyl alcohol to formaldehyde, which comprises passing the vapors of methyl alcohol admixed with an oxidizing gas at an elevated temperature over a contact mass containing a non-silicious base exchange body and being insufficiently active to oxidize a major portion of the alcohol to formic acid, the contact mass also having a compound of an element of the group which includes alkali metals, alkaline earth metals and earth metals whose oxides are not reducible by hydrogen and at least one solid, non-specific, vapor phase, chemical catalyst.

Signed at Pittsburgh, Pa., this 30th day of July, 1927.

ALPHONS O. JAEGER.